(12) United States Patent
Maeshima (10) Patent No.: US 10,924,054 B2
(45) Date of Patent: Feb. 16, 2021

(54) FAILURE DIAGNOSIS METHOD FOR INVERTER CIRCUIT

(71) Applicant: NIDEC ELESYS CORPORATION, Kawasaki (JP)

(72) Inventor: Osamu Maeshima, Kawasaki (JP)

(73) Assignee: NIDEC ELESYS CORPORATION, Kanagawa (JP)

( * ) Notice: Subject to any disclaimer, the term of this patent is extended or adjusted under 35 U.S.C. 154(b) by 24 days.

(21) Appl. No.: 16/385,027

(22) Filed: Apr. 16, 2019

(65) Prior Publication Data

US 2019/0319573 A1 Oct. 17, 2019

(30) Foreign Application Priority Data

Apr. 17, 2018 (JP) .............................. JP2018-078988

(51) Int. Cl.
| | | |
|---|---|---|
| *G01R 31/42* | (2006.01) | |
| *H02P 29/024* | (2016.01) | |
| *B62D 5/04* | (2006.01) | |
| *H02M 1/32* | (2007.01) | |
| *H02M 7/48* | (2007.01) | |

(52) U.S. Cl.
CPC ............ *H02P 29/0241* (2016.02); *B62D 5/04* (2013.01); *H02M 1/32* (2013.01); *H02M 7/48* (2013.01)

(58) Field of Classification Search
CPC ........ B62D 5/0481; G01R 31/42; H02P 27/06
See application file for complete search history.

(56) References Cited

U.S. PATENT DOCUMENTS

| | | | |
|---|---|---|---|
| 2014/0055059 A1* | 2/2014 | Uryu .................... | B62D 5/0484 318/9 |
| 2018/0152124 A1* | 5/2018 | Sasaki ................. | H02P 29/0241 |
| 2018/0208237 A1* | 7/2018 | Kumagai ............. | B62D 5/0484 |

FOREIGN PATENT DOCUMENTS

| | | |
|---|---|---|
| JP | 5018333 B2 | 9/2012 |
| JP | 5181579 B2 | 4/2013 |

\* cited by examiner

*Primary Examiner* — Alvaro E Fortich
(74) *Attorney, Agent, or Firm* — Keating & Bennett (57) ABSTRACT

A failure diagnosis method for an inverter circuit includes a first monitoring step of monitoring an inter-terminal voltage between a high-potential-side terminal and a low-potential-side terminal of each of a plurality of driving devices included in the inverter circuit, and a second monitoring step of monitoring a power supply voltage of the inverter circuit. A determination step of determining whether there is a failure in each of the driving devices from a value of the inter-terminal voltage and a value of the power supply voltage is included.

15 Claims, 4 Drawing Sheets

| DIAG-NOSIS MODE | FET DRIVING SIGNAL | | D-S VOLTAGE | | INVERTER POWER SUPPLY VOLTAGE | FAILURE PATTERN | |
|---|---|---|---|---|---|---|---|
| | | | HiSide FET | LoSide FET | | HiSide FET | LoSide FET |
| 1 | HiSide FET | OFF | ------ | ------ | NO DECREASE | NORMAL | NORMAL |
| | | ON | NOT DETECTED | ------ | NO DECREASE | | |
| | LoSide FET | OFF | ------ | ------ | NO DECREASE | | |
| | | ON | ------ | NOT DETECTED | NO DECREASE | | |
| 2 | HiSide FET | OFF | ------ | ------ | NO DECREASE | ON FAILURE | NORMAL |
| | | ON | NOT DETECTED | ------ | NO DECREASE | | |
| | LoSide FET | OFF | ------ | ------ | NO DECREASE | | |
| | | ON | ------ | ABNORMALITY DETECTED | DECREASED | | |
| 3 | HiSide FET | OFF | ------ | ------ | NO DECREASE | OFF FAILURE | NORMAL |
| | | ON | ABNORMALITY DETECTED | ------ | NO DECREASE | | |
| | LoSide FET | OFF | ------ | ------ | NO DECREASE | | |
| | | ON | ------ | NOT DETECTED | NO DECREASE | | |
| 4 | HiSide FET | OFF | ------ | ------ | NO DECREASE | NORMAL | ON FAILURE |
| | | ON | ABNORMALITY DETECTED | ------ | DECREASED | | |
| | LoSide FET | OFF | ------ | ------ | NO DECREASE | | |
| | | ON | ------ | NOT DETECTED | NO DECREASE | | |
| 5 | HiSide FET | OFF | ------ | ------ | NO DECREASE | NORMAL | OFF FAILURE |
| | | ON | NOT DETECTED | ------ | NO DECREASE | | |
| | LoSide FET | OFF | ------ | ------ | NO DECREASE | | |
| | | ON | ------ | ABNORMALITY DETECTED | NO DECREASE | | |

Fig.4

FAILURE DIAGNOSIS METHOD FOR INVERTER CIRCUIT

CROSS REFERENCE TO RELATED APPLICATION

This application claims the benefit of priority to Japanese Patent Application No. 2018-078988 filed on Apr. 17, 2018. The entire contents of this application are hereby incorporated herein by reference.

BACKGROUND OF THE DISCLOSURE

1. Field of the Disclosure

The present disclosure relates to a failure diagnosis method for an inverter circuit included in a motor control unit of an electric power steering apparatus.

2. Description of the Related Art

An electric motor that generates an auxiliary torque for a steering wheel operation by a driver of a vehicle such as an automobile and an electric power steering apparatus including a control apparatus and the like of the electric motor are constantly operating. Therefore, when any failure occurs in parts constituting a motor driving portion while driving, control for stopping the assistance operation for a steering wheel, for example, and identification of the failure parts are needed.

Hitherto, as a FET failure diagnosis method for an inverter circuit of the electric power steering apparatus, a method of monitoring a terminal voltage between a high-side FET and a low-side FET included in the inverter circuit with use of an A/D conversion function of a CPU has been known. In the method, when the inverter circuit is a three-phase bridge circuit, three signals (terminal voltages) of a U-phase, a V-phase, and a W-phase are monitored.

As a failure diagnosis of a motor driving circuit, in a conventional motor control apparatus, it is determined whether there is a failure in the motor driving circuit and the like by detecting an overcurrent (short-circuit failure) in the motor driving circuit by an overcurrent detector and from a result obtained by comparing a terminal voltage of each phase driving coil detected by motor terminal voltage detection means connected to terminals of phases of a three-phase motor and relays connected in series to phase outputs of the motor driving circuit with a threshold value in many cases.

In some cases, the conventional motor control apparatus has a configuration in which it is determined whether there is an abnormality in a FET (H-bridge circuit) included in a motor driving circuit unit by estimating the temperature of a gate driver IC included in a FET driving circuit unit with use of a feature in which an internal resistance (drain-to-source resistance) of a MOSFET included in an abnormality detection circuit provided in the FET driving circuit unit that supplies a driving signal to the motor driving circuit of an ECU linearly changes in accordance with a temperature rise due to the driving of the motor, and based on a comparison result of the estimated temperature and a threshold value.

As the failure diagnosis method for the inverter circuit, a method of performing failure diagnosis of FETs of a bridge circuit by monitoring each motor terminal voltage of the three-phase motor using an A/D conversion function of a CPU has hitherto also been known. However, parts for connecting the motor terminal voltages for the three phases to the CPU, the mounting area on a substrate occupied by a circuit pattern and the like, and the processing time period necessary for the failure diagnosis have been problems in terms of downsizing and cost reduction of the motor control apparatus.

In addition, it has been pointed out that a voltage response delay caused by a filter circuit for removing the motor terminal switching noise and a delay caused by performing the diagnosis a plurality of times for the prevention of erroneous determination of the recognition voltage by the CPU occur in a voltage monitoring method using the aforementioned A/D conversion function of the CPU.

Meanwhile, in recent years, a pre-driver IC of a motor driving circuit provided with a short-circuit detection function of the FET of the bridge circuit has been known. The short-circuit detection function is a function of detecting an abnormality (ON failure) when a drain-to-source (DS) potential of the FET driven to be turned ON is abnormally high, but the abnormality is also detected at the time of an OFF failure of the FET. Therefore, there is a problem in that the detection does not result in identification of a failure section.

In the conventional motor control apparatus, not only the motor terminal voltage detection means but also the overcurrent detector for short-circuit failure determination of the FET in the motor driving circuit is provided, and hence the configuration for the failure determination becomes complicated. Further, the comparison between a value based on the terminal voltage and a predetermined threshold value is repeatedly performed a predetermined number of times and it is determined that there is a failure in the motor driving circuit when the number of times the value based on the terminal voltage exceeds the threshold value is equal to or lower than a predetermined value. Therefore, there is a problem in that the determination is time-consuming, and also in that it only identifies whether the failure section is in the motor or the motor driving circuit and cannot individually identify a failed FET included in the motor driving circuit.

The conventional motor control apparatus uses an abnormality detection method that presupposes a temperature rise in the apparatus, and hence it has a problem in that the failure in an FET that does not cause temperature rise cannot be determined. In addition, there is a problem in that even when the failure of the entire motor driving circuit unit can be determined, a failed FET cannot be individually identified in the motor driving circuit unit.

SUMMARY OF THE DISCLOSURE

An example embodiment of the present disclosure provides a failure diagnosis method for an inverter circuit including a first monitoring step of monitoring an inter-terminal voltage between a high-potential-side terminal and a low-potential-side terminal of each of a plurality of driving devices included in the inverter circuit, and a second monitoring step of monitoring a power supply voltage of the inverter circuit. A determination step of determining whether there is a failure in each of the driving devices from a value of the inter-terminal voltage and a value of the power supply voltage is included.

An example embodiment of the present disclosure provides a motor control apparatus including an inverter circuit to drive a motor, the motor control apparatus further including a determiner to determine whether there is a failure in each of a plurality of power devices included in the inverter circuit by the failure diagnosis method for the inverter circuit.

An example embodiment of the present disclosure provides a motor control apparatus for electric power steering to assist a steering wheel operation of a driver of a vehicle and the like. An inverter circuit to drive a motor, and a determiner to determine whether there is a failure in each of a plurality of power devices included in the inverter circuit by the failure diagnosis method for the inverter circuit are included.

An example embodiment of the present disclosure provides an electric power steering apparatus to assist a steering wheel operation of a driver of a vehicle and the like. A torque sensor to detect a torque caused by the steering wheel operation, the motor control apparatus for electric power steering, and an electric motor driven by the motor control apparatus for electric power steering based on the torque detected by the torque sensor are included.

The above and other elements, features, steps, characteristics and advantages of the present disclosure will become more apparent from the following detailed description of example embodiments with reference to the attached drawings.

DETAILED DESCRIPTION OF THE EXAMPLE EMBODIMENTS

Figure 1:
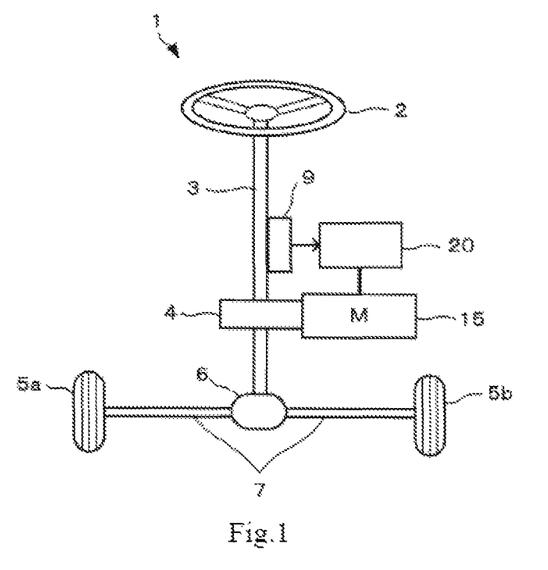
FIG. 1 is a schematic configuration of an electric power steering apparatus on which an electronic control unit (motor driving control unit) according to an example embodiment of the present disclosure is mounted.

Example embodiments according to the present disclosure is described in detail below with reference to the accompanying drawings. FIG. 1 is a schematic configuration of an electric power steering apparatus on which an electronic control unit (motor driving control unit) according to the example embodiment of the present disclosure is mounted. An electric power steering apparatus 1 in FIG. 1 includes an electronic control unit (ECU) 20, a steering wheel 2 that is a steering member, a rotating shaft 3 connected to the steering wheel 2, a pinion gear 6, a rack shaft 7, and the like.

The rotating shaft 3 is engaged with the pinion gear 6 provided at a distal end thereof. By the pinion gear 6, a rotational motion of the rotating shaft 3 is converted to a linear motion of the rack shaft 7 and a pair of wheels 5a and 5b provided at both ends of the rack shaft 7 is steered at an angle in accordance with the amount of displacement of the rack shaft 7.

A torque sensor 9 that detects a steering torque when the steering wheel 2 is operated is provided on the rotating shaft 3, and the detected steering torque is transmitted to an electronic control unit 20. The electronic control unit 20 generates a motor driving signal based on signals of the steering torque acquired by the torque sensor 9 and a vehicle speed and the like from a vehicle speed sensor (not shown), and outputs the signal to an electric motor 15.

An auxiliary torque for assisting the steering of the steering wheel 2 is output from the electric motor 15 to which the motor driving signal is input, and the auxiliary torque is transmitted to the rotating shaft 3 via a speed reduction gear 4. As a result, the steering wheel operation of the driver is assisted by assisting the rotation of the rotating shaft 3 by the torque generated in the electric motor 15.

Figure 2:
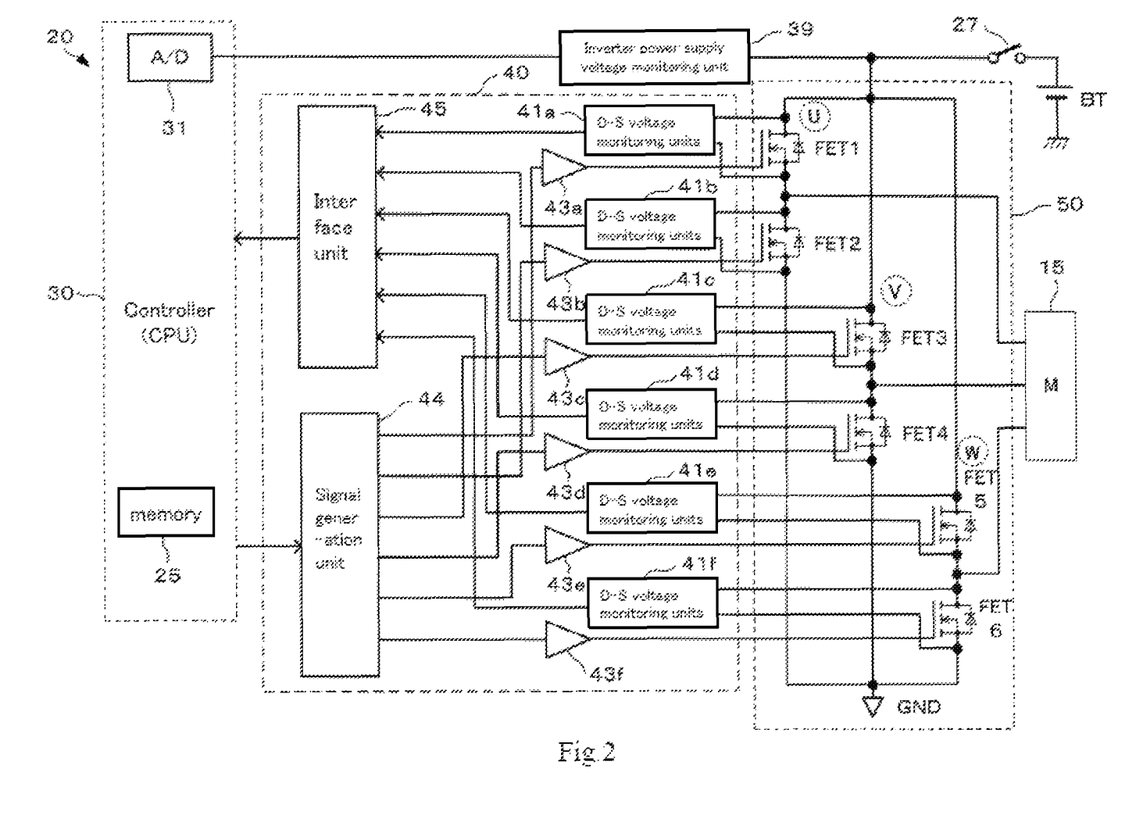
FIG. 2 is a block diagram illustrating the entire configuration of the electronic control unit according to an example embodiment of the present invention.

FIG. 2 is a block diagram illustrating the entire configuration of the electronic control unit according to the example embodiment of the present disclosure. A configuration in which the electronic control unit serving as the motor driving control unit is mounted on the electric power steering apparatus is described here as an example.

As illustrated in FIG. 2, the electronic control unit 20 includes a controller (CPU) 30 that is responsible for the control of the entire electronic control unit 20, a pre-driver unit 40 that generates a motor driving signal by a control signal from the controller 30 and functions as a FET driving circuit, a motor driving portion 50 serving as an inverter circuit (motor driving circuit) that supplies a predetermined driving current to the electric motor 15, and the like.

The controller 30 includes a microprocessor, for example, and a calculation value and the like necessary for the execution of failure diagnosis processing is temporarily stored in a memory 25 in addition to a procedure (processing program) of the failure diagnosis processing described below that is executed by the controller 30.

A power supply for driving the motor is supplied to the motor driving portion 50 by an external battery BT via a power supply relay 27. The power supply relay 27 can be formed so as to be able to cut off the power from the battery BT, and can include a semiconductor relay. The motor driving portion 50 is a FET bridge circuit including a plurality of semiconductor switching devices (a FET 1 to the FET 6), and the illustration of a switching FET that carries a driving current to the electric motor 15 is omitted in FIG. 2.

The FETs 1, 3, and 5 each have a drain terminal connected to a power supply side. In addition, the FETs 1, 3, and 5 each have a source terminal connected to respective drain terminals of the FETs 2, 4, and 6, and the FETs 2, 4, and 6 have a source terminal connected to a ground (GND) side.

An inverter power supply voltage monitoring unit 39 monitors a power supply voltage supplied to the motor driving portion 50 from the battery BT. An A/D conversion unit 31 built in the controller 30 converts a voltage monitoring result in the inverter power supply voltage monitoring unit 39 to a digital signal indicating an inverter power supply voltage value.

The controller 30 outputs a pulse width modulation (PWM) signal based on the signals of the steering torque and from the vehicle speed sensor and the like to the pre-driver unit 40. A signal generation unit 44 of the pre-driver unit 40 generates an ON/OFF control signal for the semiconductor switching devices of the motor driving portion 50 by increasing and reducing a duty of a PWM control signal in accordance with the PWM signal from the controller 30, for example. The electric motor 15 is a three-phase brushless DC motor, for example.

The FET bridge circuit described above is a three-phase (the U-phase, the V-phase, and the W-phase) inverter circuit, and the semiconductor switching devices (the FET 1 to the FET 6) included in the inverter circuit correspond to the phases of the three-phase electric motor 15. Here, the FETs 1 and 2 correspond to the U-phase, the FETs 3 and 4 correspond to the V-phase, and the FETs 5 and 6 correspond to the W-phase, respectively.

Out of those FETs, the FETs 1, 3, and 5 are upper-arm (also referred to as high-side (HiSide)) switching devices in the U-phase, the V-phase, and the W-phase, respectively, and the FETs 2, 4, and 6 are lower-arm (also referred to as low-side (LoSide)) switching devices in the U-phase, the V-phase, and the W-phase, respectively. The switching devices (FETs) are also referred to as power devices. Metal-oxide semiconductor field-effect transistors (MOSFETs) are included herein. In addition, switching devices such as insulated gate bipolar transistor (IGBT) may also be used.

The pre-driver unit 40 is an integrated circuit for controlling the motor (pre-driver IC). In the pre-driver unit 40, drivers (pre-drivers) 43a to 43f that drive the semiconductor switching devices (the FET 1 to the FET 6), short-circuit failure monitoring circuits of those semiconductor switching devices, and the like are integrated. The drivers 43a, 43c, and 43e drive the high-side (HiSide) FETs 1, 3, and 5 of the motor driving portion (inverter circuit) 50, respectively, and the drivers 43b, 43d, and 43f drive the low-side (LoSide) FETs 2, 4, and 6 of the motor driving portion 50, respectively.

Further, as illustrated in FIG. 2, the pre-driver unit 40 includes D-S voltage monitoring units 41a to 41f that monitor the voltage between the drain terminal and the source terminal (D-S) of each of the FET 1 to the FET 6. As a result, abnormality detection (abnormality monitoring) of the short circuit and the like of the semiconductor switching devices (the FET 1 to the FET 6) is performed. Here, for example, predetermined threshold values are provided for the inverter power supply voltage monitoring unit 39, and the D-S voltage monitoring units 41a to 41f, and the voltage monitoring is performed by comparing the threshold values and the input voltages with each other.

Figure 3:
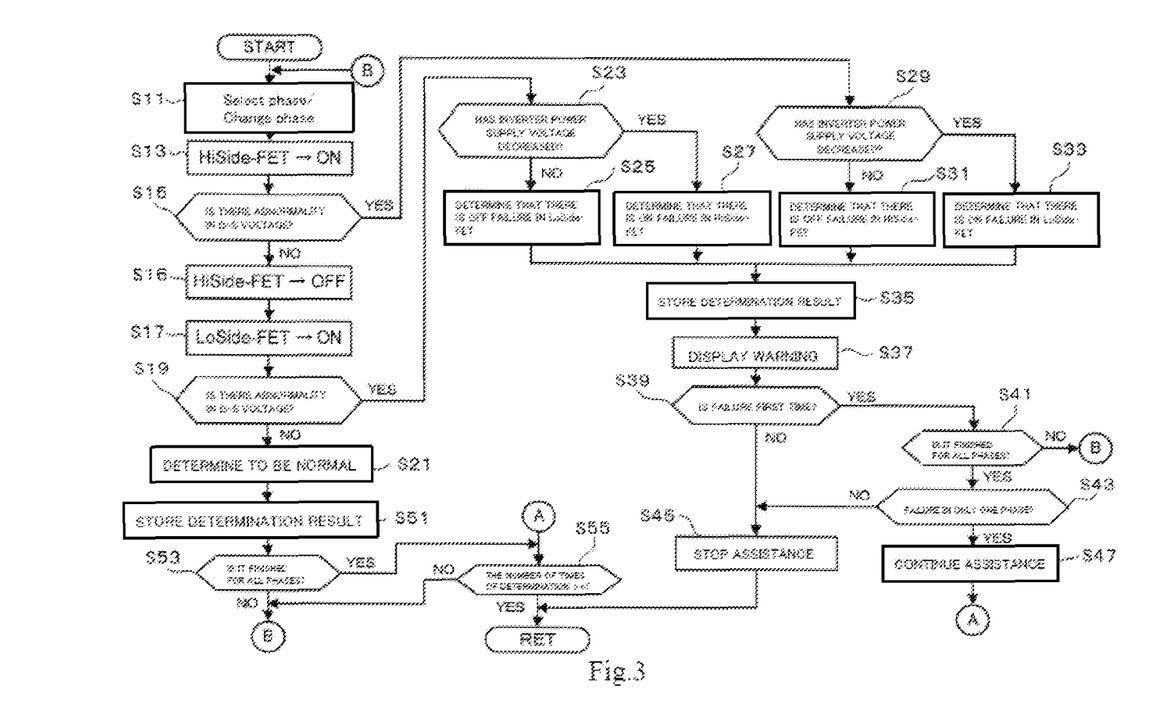
FIG. 3 is a flowchart illustrating a failure diagnosis processing procedure of an inverter circuit in a controller of the electronic control unit illustrated in FIG. 2.

Next, a failure diagnosis method of the motor driving circuit (inverter circuit) in the electronic control unit according to this example embodiment is described. FIG. 3 is a flowchart illustrating a failure diagnosis processing procedure of the inverter circuit in the controller 30 of the electronic control unit 20 illustrated in FIG. 2.

Figure 4:
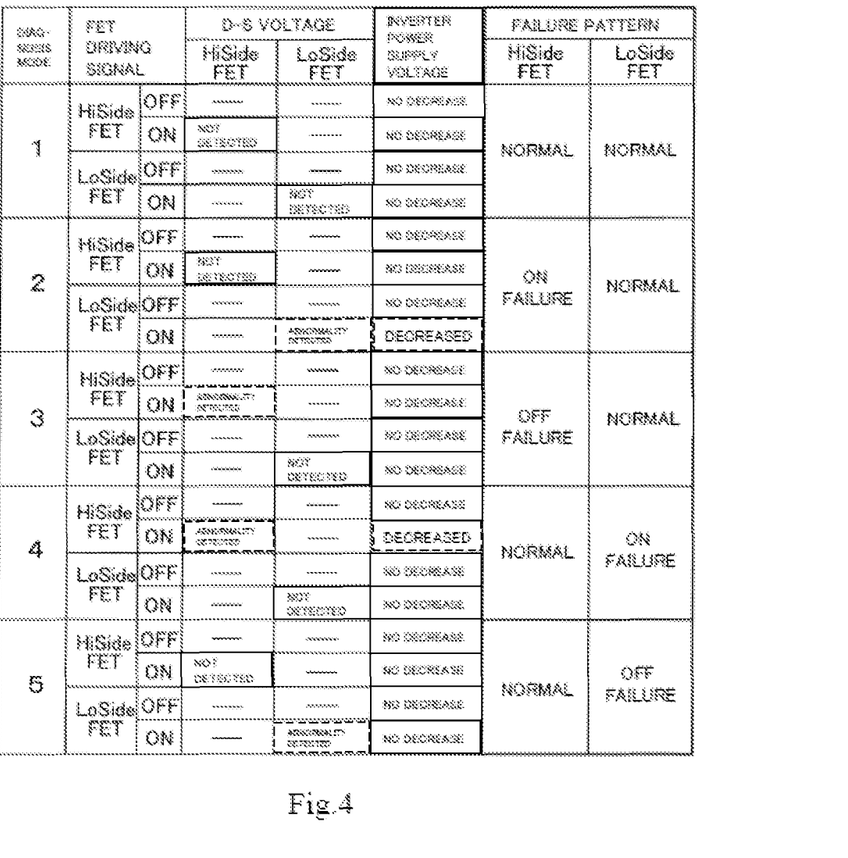
FIG. 4 is a reference chart in which a failure diagnosis mode, a signal for failure diagnosis, a failure pattern (fault state), and the like in failure diagnosis processing are combined.

FIG. 4 is a reference chart in which a failure diagnosis mode, a signal for the failure diagnosis, a failure pattern (fault state), and the like in the failure diagnosis processing in FIG. 3 are combined. The combination shown in FIG. 4 is common to the U-phase, the V-phase, and the W-phase.

In the failure diagnosis processing in the electronic control unit according to this example embodiment, the controller 30 sequentially drives the high-side (HiSide) FETs and the low-side (LoSide) FETs in the U-phase, the V-phase, and the W-phase included in the bridge circuit, and determines whether there is an abnormality in each FET based on the result and the like obtained by monitoring the voltage between the drain terminal and the source terminal (D-S) of the FET.

When the FET is driven, the FET is brought into an ON state when the drain current flows with application of a voltage that is sufficiently higher than a gate threshold voltage (a gate-to-source voltage at which the drain current starts to flow) to a place across the gate and the source. Therefore, when a voltage equal to or lower than the gate threshold voltage is applied to a place across the gate and the source, the FET is in an OFF state.

The on-resistance between the drain and the source of the FET is generally several milliohms. Therefore, if the D-S potential when the FET is driven to be turned ON is abnormally high, it can be determined that the FET is in a short-circuit failure state because a current that is higher than normal is flowing. In addition, the OFF failure means a state in which an energized state (ON state) is not obtained even when the FET is driven to be turned ON with application of an voltage equal to or higher than the gate threshold voltage.

Note that the state in which a "FET driving signal" is "OFF" in FIG. 4 means a state in which the failure diagnosis is not performed (the diagnosis function is OFF).

First, the controller 30 selects a phase of the bridge circuit FET on which the failure diagnosis is to be performed out of the U-phase, the V-phase, and the W-phase in step S11 in FIG. 3. For example, when the U-phase is selected, the controller 30 transmits a HiSide driving signal (ON signal) to the driver 43a via the signal generation unit 44 of the pre-driver unit 40 in step S13. As a result, the driver 43a brings the high-side (HiSide) switching device (FET 1) in the U-phase into an energized state (ON) by applying a predetermined voltage (gate threshold voltage) to a gate terminal of the high-side FET 1.

In subsequent step S15, the controller 30 monitors an output value from the D-S voltage monitoring unit 41a received via an interface unit 45 of the pre-driver unit 40, that is, the voltage between the drain terminal and the source terminal (D-S) of the FET 1 driven to be in an ON state.

When an abnormal potential is not detected between the drain terminal and the source terminal (D-S) of the FET 1, the controller 30 transmits an OFF signal to the driver 43a via the signal generation unit 44 of the pre-driver unit 40, and brings the high-side FET 1 into a non-energized state (OFF). In subsequent step S17, a predetermined voltage is applied to a gate terminal of a low-side (LoSide) switching device (FET 2) in the U-phase and the FET 2 is brought into an energized state (ON) by transmission of a LoSide driving signal (ON signal) to the driver 43b.

Next, in step S19, the controller 30 monitors an output value (the voltage between the drain terminal and the source terminal (D-S) of the low-side FET 2 driven to be in an ON state) from a D-S voltage monitoring unit 41b received via the interface unit 45. When an abnormal potential is not detected between the drain terminal and the source terminal of the low-side FET 2, the controller 30 determines that the FET 1 and the FET 2 are both normal.

The processing in step S13 to step S21 described above corresponds to a "diagnosis mode 1" in FIG. 4. In step S51, the controller 30 stores the determination result in step S21 described above in the memory 25.

In subsequent step S53, the controller 30 determines whether the failure diagnosis is finished for all the phases, that is, the U-phase, the V-phase, and the W-phase. When the failure diagnosis is not finished for all the phases, the processing is returned to step S11 and the phase of the FET on which the failure diagnosis is to be performed is changed.

In step S15, when an abnormal potential is detected between the drain terminal and the source terminal (D-S) of the high-side FET 1 (U-phase), the controller 30 monitors the output of the inverter power supply voltage monitoring unit 39, that is, the power supply voltage of the motor driving portion 50 in step S29. When the inverter power supply voltage has decreased, it is determined that the low-side FET 2 (U-phase) is in an ON failure state in step S33.

The determination above corresponds to a "diagnosis mode 4" in FIG. 4, and means that a failure pattern (fault pattern) of "the high-side FET: normal, the low-side FET: ON failure" is diagnosed.

Meanwhile, when the D-S voltage of the low-side FET 2 (U-phase) indicates an abnormal value in step S19, the controller 30 monitors the power supply voltage of the motor driving portion 50 based on the output from the inverter power supply voltage monitoring unit 39 in step S23. When the inverter power supply voltage has decreased, it is determined that the high-side FET 1 (U-phase) is in an ON failure state in step S27.

The determination above corresponds to a "diagnosis mode 2" in FIG. 4, and means that a failure pattern (fault pattern) of "the high-side FET: ON failure, the low-side FET: normal" is diagnosed.

When the controller 30 determines that the inverter power supply voltage has not decreased in step S23, the controller 30 determines that the low-side FET is in an OFF failure state in step S25. As a result, a failure pattern (fault pattern) of "the high-side FET: normal, the low-side FET: OFF failure" that is a "diagnosis mode 5" in FIG. 4 is diagnosed.

Similarly, when it is determined that the inverter power supply voltage has not decreased in step S29, the controller 30 determines that the high-side FET 1 is in an OFF failure state in step S31. As a result, a failure pattern (fault pattern) of "the high-side FET: OFF failure, the low-side FET: normal" corresponding to a "diagnosis mode 3" in FIG. 4 is diagnosed.

It is understood that an abnormal potential is detected between the drain terminal and the source terminal of the FET and the decrease in the inverter power supply voltage is detected by the voltage monitoring unit of the pre-driver unit 40 as in the diagnosis modes 2 and 4 when the failure diagnosis result shown in FIG. 4 shows that the high-side FET or the low-side FET is in an ON failure.

The failure diagnosis in the electronic control unit according to this example embodiment focuses attention on the fact that in the case where one of the high-side FET and the low-side FET in the same phase is in an ON failure state, a through current flows and the inverter power supply voltage decreases when the other FET is driven by the ON signal. In this case, the D-S voltage of the other FET rises and an abnormal value is detected by the D-S voltage monitoring unit of the FET. Therefore, in the diagnosis modes 2 and 4, the other FET than the FET in which an abnormal potential is detected can be identified as the failure section.

It is understood that the inverter power supply voltage does not decrease even when the short circuit of the FET is detected by the D-S voltage monitoring unit of the pre-driver unit 40 as shown in the diagnosis modes 3 and 5 when there is an OFF failure in the high-side FET or the low-side FET. The above is caused because, when one of the high-side FET and the low-side FET in the same phase is in an OFF failure state, the FET does not carry current even when the FET is driven by an ON signal.

In this case, the D-S voltage of the FET in an OFF failure state does not decrease, and hence the D-S voltage monitoring unit of the pre-driver unit 40 detects an abnormality in the FET in an OFF failure state. At this time, the FET in which an abnormality is detected can be identified as the failure section in the diagnosis modes 3 and 5 because the through current does not flow and the inverter power supply voltage does not decrease.

Next, a processing example after the FET failure diagnosis of the electronic control unit according to this example embodiment is described. The controller 30 stores the determination result in step S25, step S27, step S31, or step S33 described above in the memory 25 in step S35 in FIG. 3 after the failure diagnosis of the FET. Then, in step S37, a warning display in accordance with the failure determination result in step S25, step S27, step S31, or step S33 above is performed, for example. As the warning display, display providing a notification that a failure is occurring in a switching device (FET) in the inverter circuit of the electronic control unit by the lighting, flashing, and the like of a lamp provided on a panel of the vehicle, for example, is conceived.

In step S39, the controller 30 determines whether it is the first time that the failure has been determined for the FET. When the determination is the first failure determination, it is determined whether the failure diagnosis is finished for all the phases in step S41. When the failure diagnosis of all the phases is not finished, the processing is returned to step S11.

Meanwhile, when the failure diagnosis processing is finished for all the phases, the controller 30 determines whether the failure is a failure (single fault) in only a FET in one phase and is the OFF failure of the FET in step S43. When the failure is a failure in only one phase and is the OFF failure, the assistance for the steering wheel of the electric power steering apparatus on which the inverter circuit (motor driving circuit) is mounted is continued (step S47).

As a result, assistance by degraded motor driving by two phases can be continued, and the assistance of the steering wheel operation for the driver of the vehicle can be continued although the performance of 100% cannot be guaranteed. At this time, although not shown in FIG. 2, it is also possible to separate only the phase exhibiting an abnormality by turning OFF a phase relay exhibiting the abnormality.

When a failure is determined for the FET a plurality of times (twice or more) in step S39, when it is determined that the failure in the FET is not a failure in only one phase in step S43, or when the failure is the ON failure of the FET even when the failure is a failure in only one phase, the controller 30 stops the assistance for the steering wheel in step S45. As a result, danger due to the FET being burned down and the like and significant deterioration of the assistance function can be prevented when a failure is determined a plurality of times, for example.

When it is diagnosed that the FETs are normal for all the phases, that is, the U-phase, the V-phase, and the W-phase in step S53, or when the failure in only one phase continues after the failure diagnosis of the FETs for all the phases in step S41 and assistance continuing processing is performed in step S47, the controller 30 determines whether the number of times of the failure diagnosis for all the phases is equal to or more than a predetermined number of times (n times) in step S55.

As described above, by performing the failure determination for the FETs in all the phases a plurality of times, reliable failure determination processing can be continuously executed for the FETs serving as power devices for a predetermined processing time period (for example, several tens of milliseconds), and a failure determination result with higher accuracy can be acquired.

Note that, although the failure diagnosis is performed a plurality of times in a predetermined processing time period in the aforementioned failure diagnosis processing, the present disclosure is not limited thereto. For example, by limiting n times of the determination in the failure diagnosis to once or several times in step S55 in FIG. 3, a configuration in which an initial failure in a motor control apparatus for electric power steering is responded to by diagnosing whether there is an initial failure in the inverter circuit when the ECU is starting up (the beginning of the driving of the motor) can be realized.

In addition, by a configuration in which n times of the failure diagnosis in step S55 is not limited and it is constantly diagnosed whether there is a failure in the FET of the inverter circuit, the failure in the motor control apparatus for electric power steering can be constantly (that is, continuously after the motor is driven) responded to while the ECU is executing the control and not only at the time of starting up the ECU.

Further, a configuration in which the assistance is stopped or the assistance is continued in accordance with the period in which the FET failure of the inverter circuit occurs is also possible. As a result, an assistance function in accordance with the degree of the failure in the FET can be provided in the motor control apparatus for electric power steering.

As described above, the electronic control unit according to this example embodiment has configuration in which, in the device for driving the motor (pre-driver IC), which is obtained by integrating the pre-driver, the monitoring circuit, and the like and which is a device that drives the inverter circuit including the plurality of semiconductor switching devices (FETs) for driving the motor, the D-S voltage of each FET in the inverter circuit is monitored, and the controller connected to the pre-driver unit receives the monitoring result of the D-S voltage of the FET from the device for driving the motor and determines whether there is a short circuit and the like in each FET from the D-S voltage monitoring result and the monitoring result of the inverter power supply voltage.

As described above, by a configuration using a function of the pre-driver IC for driving the motor for the failure diagnosis of the FETs, the failure diagnosis can be speedily performed by a small number of failure determination elements. In addition, the detection of the motor terminal voltage is not used in the failure diagnosis. Therefore, the circuit configuration for the failure determination is simplified, and the number of parts can be reduced and the substrate area can be downsized in the electronic control unit.

Further, whether there is a failure in the FETs is determined for each phase of the three phases, that is, the U-phase, the V-phase, and the W-phase for the inverter circuit that drives the three-phase motor. Therefore, the number of times the FETs are switched can be reduced, the failure diagnosis processing can be simplified, and the time necessary for the diagnosis can be reduced. In addition, the inverter power supply voltage is checked after the abnormality determination of the FETs. That is, the abnormality determination of the FETs is performed first. As a result, the failed FET can be identified, and not only the ON failure but also the OFF failure in the FETs can be easily determined. Further, by performing the failure detection of the FETs at a timing of PWM driving of the FETs, erroneous determination can be suppressed.

In addition, in the electric power steering apparatus, by including the motor control apparatus for electric power steering having the failure diagnosis function for the short circuit and the like of the FETs of the inverter circuit described above, it can be determined whether there is a failure in the FETs that are the motor driving devices with a simple configuration. As a result, the start-up time of the motor control apparatus for electric power steering can be reduced, and hence the time period until the steering assistance starts can be reduced. Further, when an abnormality is detected during the steering assistance, the failure can be determined (defined) in a short amount of time. Therefore, the time period in which the steering assistance is suspended can be reduced when it can be determined that there is no failure.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A failure diagnosis method for an inverter circuit, the failure diagnosis method comprising:
   a first monitoring step of monitoring an inter-terminal voltage between a high-potential-side terminal and a low-potential-side terminal of each of a plurality of driving devices included in the inverter circuit;
   a second monitoring step of monitoring a power supply voltage of the inverter circuit; and
   a determination step of determining whether there is a failure in each of the plurality of driving devices based on a value of the inter-terminal voltage and a value of the power supply voltage.

2. The failure diagnosis method for the inverter circuit according to claim 1, wherein the determination step includes determining an ON failure and an OFF failure in each of the plurality of driving devices.

3. The failure diagnosis method for the inverter circuit according to claim 2, wherein the second monitoring step is executed after the first monitoring step is executed.

4. The failure diagnosis method for the inverter circuit according to claim 1, wherein the determination of whether there is a failure is performed a plurality of times in the determination step.

5. A motor control apparatus comprising:
   the inverter circuit to drive a motor; and
   a determiner to determine whether there is a failure in each of a plurality of power devices included in the inverter circuit by the failure diagnosis method for the inverter circuit according to claim 1.

6. The motor control apparatus according to claim 5, wherein the inter-terminal voltage of each of the plurality of power devices is monitored by a driver that drives the motorand controls the inverter circuit.

7. The motor control apparatus according to claim 5, wherein
   the motor includes three phases; and
   the determiner determines whether there is a failure in the power devices included in the inverter circuit for each phase of the three phases.

8. The motor control apparatus according to claim 5, wherein the plurality of power devices define a bridge circuit to drive the motor in the inverter circuit.

9. A motor control apparatus for electric power steering to assist a steering wheel operation of a driver of a vehicle, the motor control apparatus comprising:
   the inverter circuit to drive a motor; and
   a determiner to determine whether there is a failure in each of a plurality of power devices included in the inverter circuit by the failure diagnosis method for the inverter circuit according to claim 1.

10. The motor control apparatus for electric power steering according to claim 9, wherein the determiner determines whether there is a failure only in a beginning of driving of the motor.

11. The motor control apparatus for electric power steering according to claim 9, wherein the determiner continuously determines whether there is a failure after driving of the motor.

12. The motor control apparatus for electric power steering according to claim 10, wherein the assistance is stopped or continued in accordance with a period in which the failure occurs.

13. The motor control apparatus for electric power steering according to claim 11, wherein the assistance is stopped or continued in accordance with a period in which the failure occurs.

14. The motor control apparatus for electric power steering according to claim 9, wherein the plurality of power devices define a bridge circuit to drive the motor in the inverter circuit.

15. An electric power steering apparatus to assist a steering wheel operation of a driver of a vehicle, the electric power steering apparatus comprising:
- a torque sensor to detect a torque caused by the steering wheel operation;
- the motor control apparatus for electric power steering according to claim 9; and
- an electric motor driven by the motor control apparatus for electric power steering based on the torque detected by the torque sensor.

* * * * *